(12) United States Patent
Fang et al.

(10) Patent No.: US 12,111,158 B2
(45) Date of Patent: *Oct. 8, 2024

(54) MEMS GYROSCOPE CONTROL CIRCUIT

(71) Applicant: STMicroelectronics, Inc., Coppell, TX (US)

(72) Inventors: Deyou Fang, Frisco, TX (US); Chao-Ming Tsai, Southlake, TX (US); Milad Alwardi, Allen, TX (US); Yamu Hu, Allen, TX (US); David McClure, Carrollton, TX (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,088

(22) Filed: Apr. 18, 2023

(65) Prior Publication Data

US 2023/0273024 A1 Aug. 31, 2023

Related U.S. Application Data

(63) Continuation of application No. 17/504,994, filed on Oct. 19, 2021, now Pat. No. 11,662,205, which is a continuation of application No. 16/452,850, filed on Jun. 26, 2019, now Pat. No. 11,175,138.

(51) Int. Cl.
*G01C 19/5726* (2012.01)
*G01C 19/5733* (2012.01)
*G01C 25/00* (2006.01)

(52) U.S. Cl.
CPC ..... *G01C 19/5726* (2013.01); *G01C 19/5733* (2013.01); *G01C 25/005* (2013.01)

(58) Field of Classification Search
CPC .............. G01C 19/5726; G01C 25/005; G01C 19/5733; G01C 19/5614; G01C 19/5621; G01C 19/5755; G01C 19/5762
USPC ..... 73/1.77, 504.12–504.16, 504.18, 514.15, 73/514.29
See application file for complete search history.

(56) References Cited

U.S. PATENT DOCUMENTS

| 5,351,519 A | 10/1994 | Kress |
| 6,029,516 A | 2/2000 | Mori et al. |
| 6,427,518 B1 | 8/2002 | Miekley et al. |
| 6,564,637 B1 | 5/2003 | Schalk et al. |

(Continued)

OTHER PUBLICATIONS

Ganesh K. Balachandran et al.: "A 3-Axis Gyroscope for Electronic Stability Control With Continuous Self-Test," IEEE Journal of Solid State Circuits, 2016, pp. 1-10.

(Continued)

*Primary Examiner* — Robert R Raevis
(74) *Attorney, Agent, or Firm* — Crowe & Dunlevy LLC

(57) ABSTRACT

A microelectromechanical system (MEMS) gyroscope includes a driving mass and a driving circuit that operates to drive the driving mass in a mechanical oscillation at a resonant drive frequency. An oscillator generates a system clock that is independent of and asynchronous to the resonant drive frequency. A clock generator circuit outputs a first clock and a second clock that are derived from the system clock. The drive loop of the driving circuit including an analog-to-digital converter (ADC) circuit that is clocked by the first clock and a digital signal processing (DSP) circuit that is clocked by the second clock.

14 Claims, 5 Drawing Sheets

(56) References Cited

U.S. PATENT DOCUMENTS

| | | | |
|---|---|---|---|
| 7,155,979 | B2 | 1/2007 | Lasalandra et al. |
| 8,476,970 | B2 | 7/2013 | Mokhtar et al. |
| 9,714,842 | B2 | 7/2017 | Anac et al. |
| 9,846,037 | B2 | 12/2017 | Aaltonen |
| 10,760,910 | B2 | 9/2020 | Gando et al. |
| 11,175,138 | B2 * | 11/2021 | Fang .................. G01C 25/005 |
| 11,662,205 | B2 * | 5/2023 | Fang ................. G01C 19/5733 |
| | | | 73/504.12 |
| 2005/0016273 | A1 | 1/2005 | Murata et al. |
| 2005/0264366 | A1 | 12/2005 | Zivanovic et al. |
| 2005/0268716 | A1 | 12/2005 | Hrovat et al. |
| 2006/0280202 | A1 | 12/2006 | Kelly |
| 2007/0084270 | A1 | 4/2007 | Jarrett |
| 2007/0169551 | A1 | 7/2007 | Kelly |
| 2008/0190199 | A1 | 8/2008 | Prandi et al. |
| 2010/0307243 | A1 | 12/2010 | Prandi et al. |
| 2011/0146402 | A1 | 6/2011 | Konadel et al. |
| 2011/0146403 | A1 | 6/2011 | Rizzo Piazza Roncoroni et al. |
| 2011/0197674 | A1 | 8/2011 | Prandi et al. |
| 2011/0254599 | A1 | 10/2011 | Dikshit et al. |
| 2012/0312095 | A1 | 12/2012 | Hanson et al. |
| 2013/0268227 | A1 | 10/2013 | Opris et al. |
| 2013/0271228 | A1 | 10/2013 | Tao et al. |
| 2013/0283908 | A1 | 10/2013 | Geen et al. |
| 2014/0190258 | A1 | 7/2014 | Donadel et al. |
| 2014/0250970 | A1 | 9/2014 | Fang et al. |
| 2014/0250971 | A1 | 9/2014 | Fang et al. |
| 2014/0260609 | A1 * | 9/2014 | Garbarino .......... G01C 19/5726 |
| | | | 73/504.12 |
| 2015/0033821 | A1 | 2/2015 | Mangano |
| 2015/0177775 | A1 | 6/2015 | Beaulation et al. |
| 2015/0185011 | A1 | 7/2015 | Beaulaton et al. |
| 2015/0226556 | A1 | 8/2015 | Aaltonen |
| 2015/0280949 | A1 | 10/2015 | Cornibert et al. |
| 2016/0010994 | A1 | 1/2016 | Ackerman |
| 2016/0103174 | A1 | 4/2016 | Aaltonen et al. |
| 2016/0349056 | A1 | 12/2016 | Thompson et al. |
| 2017/0168088 | A1 | 6/2017 | Coronato et al. |
| 2017/0227569 | A1 | 8/2017 | Alwardi et al. |
| 2017/0328712 | A1 | 11/2017 | Collin et al. |
| 2018/0038692 | A1 | 2/2018 | Prati et al. |
| 2018/0058854 | A1 | 3/2018 | Suzuki et al. |
| 2018/0335446 | A1 | 11/2018 | Choi et al. |
| 2019/0025056 | A1 | 1/2019 | Hughes et al. |
| 2019/0145773 | A1 | 5/2019 | Collin et al. |
| 2020/0278205 | A1 | 9/2020 | Kraver |
| 2020/0400433 | A1 | 12/2020 | Aaltonen et al. |
| 2020/0408523 | A1 | 12/2020 | Fang et al. |
| 2020/0408524 | A1 | 12/2020 | Hu et al. |

OTHER PUBLICATIONS

Maeda, Daisuke, et al: "MEMS Gyroscope With Less Than 1-deg/h Bias Instability Variation in Temperature Range From -40° C. to 125° C.," IEEE Sensors Journal, vol. 18, No. 3, Feb. 1, 2018, pp. 1006-1015.

Shaeffer, Derek K.: "MEMS Inertial Sensors: A Tutorial Overview," IEEE Communications Magazine, Apr. 2013, pp. 100-109.

Sun, X, et al: "Stability and Resolution Analysis of a Phase-Locked Loop Natural Frequency Tracking System for MEMS Fatigue Testing," Journal of Dynamic Systems, Measurement, and Control, Dec. 2002, vol. 124, pp. 599-605.

Bu, Feng, et al: "MEMS Gyroscope Automatic Real-Time Mode-Matching Method Based on Phase-Shifted 45o Additional Force Demodulation," MDPI, Sep. 7, 2018, 16 pages, 2018.

Khazaaleh, Shadi, et al: "Vulnerability of MEMS Gyroscopes to Targeted Acoustic Attacks," IEEE Access, Jul. 5, 2019, 10 pages, 2019.

Antonello, Riccardo, et al.: "Open Loop Compensation of the Quadrature Error in MEMS Vibrating Gyroscopes," IEEE, 20096 pgs.

* cited by examiner

MEMS GYROSCOPE CONTROL CIRCUIT

CROSS REFERENCE TO RELATED APPLICATIONS

This application is a continuation of U.S. patent application Ser. No. 17/504,994, filed Oct. 19, 2021, which is a continuation of U.S. patent application Ser. No. 16/452,850, filed Jun. 26, 2019, now U.S. Pat. No. 11,175,138, the disclosures of which are incorporated herein by reference.

TECHNICAL FIELD

The present invention generally relates to a microelectromechanical system (MEMS) sensor of a gyroscope type and, in particular, to a control circuit for controlling the operation of the MEMS sensor.

BACKGROUND

A capacitive microelectromechanical system (MEMS) gyroscope sensor is a complex electromechanical structure that includes two masses that are moveable with respect to a stator body and are coupled to one another so as to have a relative degree of freedom. The two mobile masses are both capacitively coupled to the stator body. A first one of the mobile masses (referred to as the driving mass) is dedicated to driving and is kept in oscillation at a resonance frequency. The second one of the mobile masses (referred to as the sensing mass) is drawn along in oscillating motion due to the coupling to the driving mass. In the case of a rotation of the structure with respect to a predetermined gyroscope axis with an angular velocity, the sensing mass is subjected to a Coriolis force proportional to the angular velocity itself. A change in capacitance with respect to the sensing mass is sensed in order to detect the angular motion (rotation).

FIG. 1 shows a block diagram of a MEMS gyroscope sensor 10. The sensor 10 includes a MEMS microstructure 12 with a stator body, a driving mass 14 and a sensing mass 16. For simplicity, the MEMS microstructure 12 illustrates the case of a uniaxial gyroscope in which only one sensing mass 16 is present, although the configuration and operation is equally applicable to multi-axial gyroscopes with multiple sensing masses. The driving mass 14 is elastically constrained to the stator body so as to be able to oscillate about a rest position according to one degree of freedom shown by the X-axis (also referred to as the driving axis). In this regard, the driving mass and stator body define a resonant mechanical system with a resonant frequency. The sensing mass 16 is mechanically coupled to the driving mass 14 so as to be driven in motion according to the same degree of freedom (i.e., in the X-axis). Moreover, the sensing mass 16 is elastically coupled to the driving mass 14 so as to oscillate in turn with respect to the driving mass according to another degree of freedom shown by the Y-axis (also referred to as the sensing axis).

The driving mass 14 and sensing mass 16 are capacitively coupled to the stator body. In particular, the driving mass 14 is capacitively coupled to the stator body through a set of driving capacitors 20 which are connected to drive actuation electrodes and a set of drive sensing capacitors 22 which are connected to drive sense electrodes. The driving capacitors 20 are configured to respond to an applied differential oscillating drive signal Ds by applying an electrostatic force to induce oscillatory movement of the mobile masses in the X-axis. The drive sensing capacitors 22 are configured such that their capacitance depends in a differential way on the position of the driving mass 14 with respect to the stator body relative to the X-axis. The sensing mass 16 is capacitively coupled to the stator body through a set of sensing capacitors 24 which are connected to sensing electrodes. The sensing capacitors 24 are configured such that their capacitance depends in a differential way on the position of the sensing mass 16 with respect to the stator body relative to the Y-axis, and thus signals generated by the sensing capacitors 24 are indicative of movement relative to the Y-axis.

An application specific integrated circuit (ASIC) is electrically connected to the MEMS microstructure 12. The ASIC of the sensor 10 includes a driving circuit 30 having an input coupled to the drive sense electrodes for the drive sensing capacitors 22 to receive a differential drive sense signal Dss and an output coupled to the drive actuation electrodes for the driving capacitors 20 to apply the drive signal Ds. This coupling in feedback forms an oscillating microelectromechanical loop that is configured to keep the driving mass 14 in oscillation at the resonance frequency with a controlled amplitude. The ASIC of the sensor 10 further includes a sensing circuit 40 having a first input coupled to the drive sense electrodes for the drive sensing capacitors 22 and a second input coupled to the sensing electrodes for the sensing capacitors 24. The sensing circuit 40 receives a differential sense signal Ss generated by the sensing capacitors 24 and indicative of displacement of the sensing mass 16 relative to the Y-axis and operates to generate a demodulation signal in phase with rate (i.e., in phase with drive motion velocity) and a demodulation signal in phase with quadrature (i.e., in phase with drive motion displacement). The sensing circuit 40 demodulates the differential sense signal Ss with the demodulation signal in phase with rate, and outputs an in phase signal indicative of sensed angular velocity (AVout) as a result of that demodulation.

Imperfections in the elastic connections between the mobile masses 14 and 16 and the stator body may result in oscillation which does not perfectly align with the X-axis. This defect may produce a force having a component directed along the Y-axis and, as a result thereof, introduce a signal component at the input of the sensing circuit 40 with a phase offset of 90° relative to the modulated angular velocity component. This is referred to in the art as quadrature error.

More particularly, in the MEMS sensor the rate induced Coriolis signal is in phase with the velocity of drive motion. The quadrature error signal is in phase with the displacement of drive motion. The differential sense signal Ss has two components at the drive frequency Fd: (1) a Coriolis signal component: $Srate*\cos(2\pi*Fd)$, and (2) a quadrature component: $Sqaud*\sin(2\pi*Fd)$, so, mathematically, the differential sense signal $Ss=Srate*\cos(2\pi*Fd)+Sqaud*\sin(2\pi*Fd)$, where Srate is the baseband rate signal, and Squad is the baseband quadrature. These two components have same the drive frequency Fd, only with a 90° phase difference. Since drive motion is at the drive frequency Fd with constant amplitude, the differential drive sense signal Dss has only one component, so it is a very pure sinusoidal signal. However, depending on implementation, the differential drive sense signal Dss can have different phase, i.e., its phase can be either in phase with velocity (cos) or in phase with displacement (sin). The differential drive sense signal Dss is used by the sensing circuit 40 as a phase reference. Based on the differential drive sense signal Dss, the sensing circuit 40 can generate two demodulation signals, one in phase with rate (velocity) and one in phase with quadrature (displacement).

To address the issue of quadrature error, the system 10 includes quadrature error compensation control. The sensing mass 16 is further capacitively coupled to the stator body through a set of quadrature error compensation capacitors 26 connected to quadrature error compensation electrodes. The quadrature error compensation capacitors 26 are configured to respond to an applied quadrature error compensation signal QCs by applying an electrostatic force on the sensing mass 16 to counteract the force which induces the quadrature error. The sensing circuit 40 quadrature demodulates the differential sense signal Ss generated by the sensing capacitors 24 in response to the differential drive sense signal Dss generated by the drive sensing capacitors 22 to generate a quadrature phase signal indicative of sensed quadrature error (qerror) as a result of that demodulation. The ASIC of the sensor 10 further includes a quadrature error compensation circuit 50 having an input configured to receive the quadrature error sense signal (qerror) from the sensing circuit 30 and an output coupled to the quadrature error compensation electrodes for the quadrature error compensation capacitors 26 to apply the differential quadrature error compensation signal QCs. This coupling in feedback forms a microelectromechanical loop that is configured to ensure that the induced oscillation of the sensing mass 16 has no quadrature error.

It is typical in the prior art for the MEMS gyroscope sensor to use a self-clocking architecture. This means that the system clock for the MEMS sensor is locked to the MEMS drive mode resonant frequency through a phase-locked-loop (PLL) circuit. The PLL can be implemented as either an analog PLL (APLL) or a digital PLL (DPLL) and is typically used to generate a system clock that is a multiple of the drive frequency Fd. A block diagram of a prior art, all-digital PLL, implementation for the clock generation circuit for a self-clocking architecture MEMS gyroscope sensor is shown in FIG. 2A. The drive circuit 30 control loop produces an analog sinusoid signal 102 (sin(2π*Fd)) that oscillates at the frequency Fd of the mechanical oscillation of the driving mass 14 of the MEMS microstructure 12. A quantization circuit 103 compares the analog sinusoid signal 102 to a reference voltage and outputs a digital clock signal 105 oscillating at the frequency Fd. A phase lock loop (PLL) circuit 107 uses the digital clock signal 105 as a reference clock to generate a system clock (CLK Fsys) 109 at a frequency Fsys that is a multiple of the resonant drive frequency Fd. A clock generator circuit 111 processes the system clock CLK Fsys 109 to generate a plurality of digital processing clocks 113 that are used for clocking the operation of digital circuits used within the driving circuit 30, sensing circuit 40 and quadrature error compensation circuit 50. For example, the digital processing clocks 113 may be used for clocking the operation of digital circuits such as analog-to-digital converters (ADCs) and digital signal processors (DSPs).

There are a number of concerns with the use of a self-clocking architecture for the MEMS gyroscope sensor. The performance of the gyroscope depends on the MEMS resonance drive frequency Fd. Because of this, any drift or shift of the resonance drive frequency Fd can result in degradation of system performance (noise, zero rate output error, scale factor error, etc.). It is also noted that the system response of the gyroscope is dependent on the resonance drive frequency Fd. Because of this, the transfer functions (poles, zeroes, bandwidth) will depend on the drive frequency Fd and as a result overall system performance will vary from part to part, over temperature and with aging. There is a need in the art for a better way to provide a system clock for a MEMS gyroscope sensor, so as to make the performance of gyroscope independent of MEMS drive frequency.

With respect to the driving circuit 30, FIG. 2B shows a block diagram of a prior art control loop. The driving circuit 30 includes an analog front end (AFE) circuit 100 having inputs coupled to the drive sensing capacitors 22 to receive the differential drive sense signal Dss (which is indicative of driving mass oscillation displacement or velocity—thus being indicative of amplitude, frequency and phase). The AFE circuit 100 generates an analog sinusoid signal 102 (sin(2π*Fd)) that oscillates at the drive frequency Fd of the mechanical oscillation of the driving mass 14 of the MEMS microstructure 12. The AFE circuit 100 may comprise, for example, a charge to voltage (C2V) converter circuit that operates to convert the sensed differential charge on the drive sensing capacitors 22 to output a corresponding analog voltage signal 102. The analog sinusoid signal 102 is converted by an analog-to-digital converter (ADC) circuit 106, clocked by one of the clock signals 113, to generate a digital sinusoid signal 108. A digital signal processing circuit 112, also clocked by one of the clock signals 113, processes the digital sinusoid signal 108 to extract the frequency, phase and amplitude of the sensed drive motion of the driving mass 14. Frequency tracking and automatic gain control processing is applied by the digital signal processing circuit 112 to generate a digital drive signal 114 that is converted by a digital-to-analog converter (DAC) circuit 120 to output the analog differential drive signal Ds.

A noted problem with the prior art control loop for the driving circuit 30 as shown in FIG. 2B is that it requires use of an ADC circuit 106 having a high-bandwidth and a high-resolution in order to process the analog sinusoid signal 102 (the ADC circuit 106 accordingly has a high power consumption). An additional concern with the prior art control loop for the driving circuit 30 as shown in FIG. 2B is that the digital signal processing circuit 112 requires high-resolution and high-power digital filtering of the digital sinusoid signal 108. Furthermore, frequency tracking typically requires use of a digital phase lock loop (PLL), a complicated and high-power consuming circuit as well, in order to generate the digital drive signal 114 with a 90° phase shift. The prior art solution for the drive circuit 30 control loop is accordingly complex, expensive and consumes a high amount of power. There is a need in the art for a better drive control loop solution which should have much less complexity, less power consumption, and be more robust.

SUMMARY

In an embodiment, a microelectromechanical system (MEMS) gyroscope comprises: a driving mass; a driving circuit configured to drive the driving mass in a mechanical oscillation at a resonant frequency; an oscillator configured to generate a system clock independent of and asynchronous to the resonant drive frequency of the MEMS; and a clock generator circuit configured to generate a first clock and a second clock from the system clock. The driving circuit forms a drive loop including an analog-to-digital converter (ADC) circuit that is clocked by the first clock and a digital signal processing (DSP) circuit that is clocked by the second clock.

In an embodiment, a control circuit for driving a driving mass of a microelectromechanical system (MEMS) gyroscope in a mechanical oscillation at a resonant drive frequency comprises: an analog sensing circuit configured to sense the mechanical oscillation; a digital circuit clocked by a digital clock signal and configured to process output from the analog sensing circuit and generate a drive signal for application to cause movement of the driving mass; an oscillator configured to generate a system clock independent of and asynchronous to the resonant drive frequency; and a clock generator circuit configured to generate the digital clock signal from the system clock.

In an embodiment, a control circuit for controlling operation of a microelectromechanical system (MEMS) gyroscope including a driving mass sensing mass coupled to the driving mass comprises: a driving circuit configured to drive the driving mass in a mechanical oscillation at a resonant drive frequency; an analog sensing circuit configured to sense a Coriolis displacement of the sensing mass; a digital circuit clocked by a digital clock signal and configured to process output from the analog sensing circuit and generate an angular velocity output signal indicative of the sensed Coriolis displacement; an oscillator configured to generate a system clock independent of and asynchronous to the resonant drive frequency; and a clock generator circuit configured to generate the digital clock signal from the system clock.

In an embodiment, a control circuit for controlling operation of a microelectromechanical system (MEMS) gyroscope including a driving mass sensing mass coupled to the driving mass comprises: a driving circuit configured to drive the driving mass in a mechanical oscillation at a resonant drive frequency; a sensing circuit configured to sense a Coriolis displacement of the sensing mass and generate a quadrature error signal from a quadrature component of the sensed Coriolis displacement; a digital circuit clocked by a digital clock signal and configured to process the quadrature error signal and apply a quadrature error compensation force to the sensing mass in response thereto; an oscillator configured to generate a system clock independent of and asynchronous to the resonant drive frequency; and a clock generator circuit configured to generate the digital clock signal from the system clock.

BRIEF DESCRIPTION OF THE DRAWINGS

For a better understanding of the embodiments, reference will now be made by way of example only to the accompanying figures in which.

DETAILED DESCRIPTION

Figure 1:
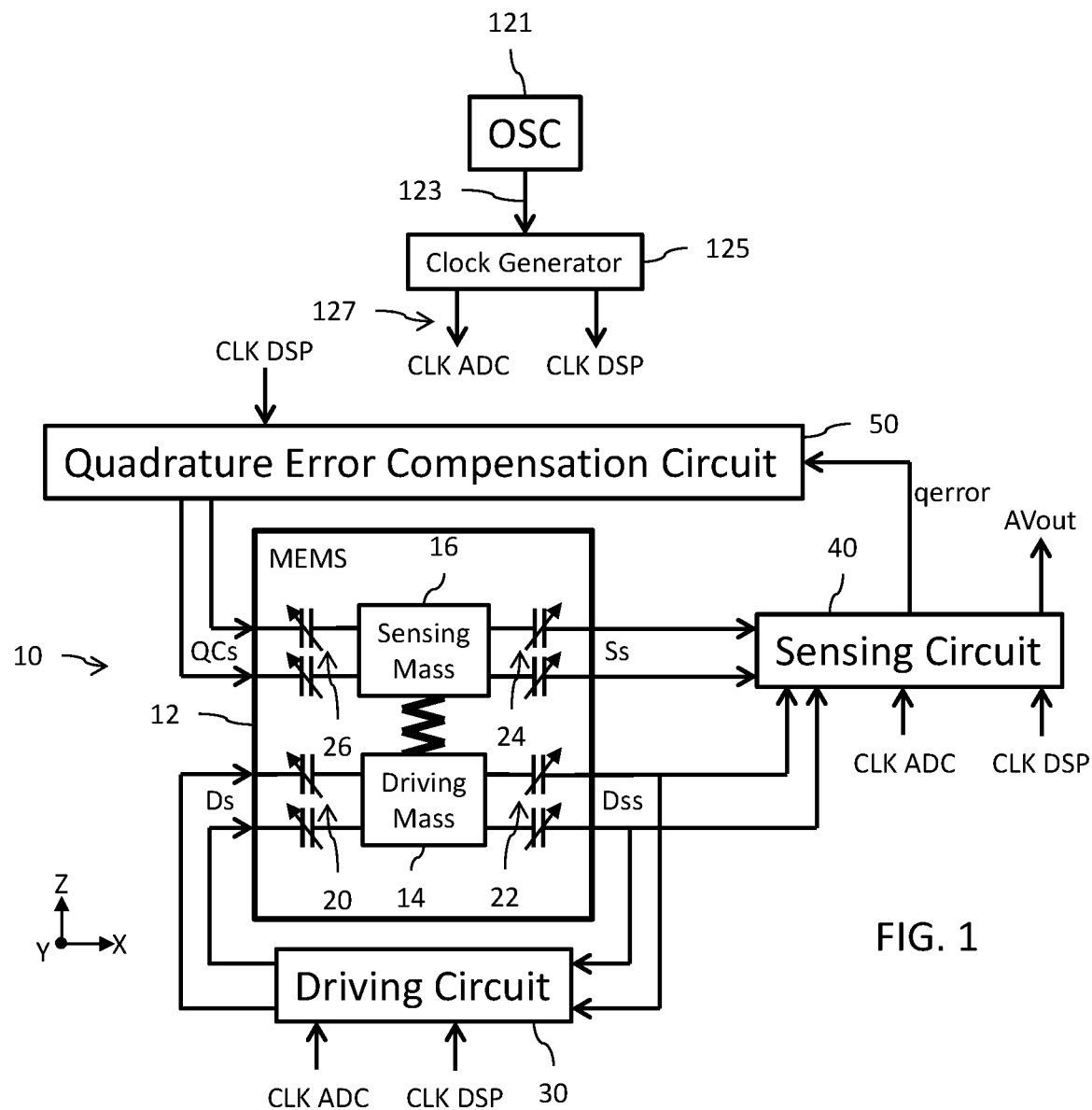
FIG. 1 is a block diagram of a MEMS gyroscope sensor.

With reference once again to FIG. 1, the MEMS gyroscope sensor does not use a self-clocking architecture as described above (using the example circuit of FIG. 2A), but rather uses an independent system clock architecture. A high accuracy clock source, such as an oscillator (OSC) 121 of a relaxation or crystal type (for example, with a variation of less than 1%) generates a system clock (CLK Fsys) 123 at a clock frequency Fsys that is substantially greater than the resonant drive frequency Fd of the MEMS (for example, Fsys may be on the order of 1000*Fd). Importantly, the system clock 123 is generated independently of the MEMS drive oscillation and is asynchronous with the MEMS drive oscillation. A clock generator circuit 125 processes the system clock CLK Fsys 123 to generate a plurality of digital processing clocks 127 that are used for clocking the operation of digital circuits used within the driving circuit 30, sensing circuit 40 and quadrature error compensation circuit 50. For example, the digital processing clocks 127 may include one or more clocks (CLK ADC) for clocking the operation of analog-to-digital converter (ADC) circuits and one or more clocks (CLK DSP) for clocking the operation of digital signal processor (DSP) circuits. An advantage of the independent system clock architecture is that the gyroscope performance is not adversely affected by any shift or drift in the resonance frequency Fd of the MEMS since the oscillator 121 is independent of and asynchronous to the frequency Fd. Concerns with part-to-part variation in system performance, as well as variation in system performance due to temperature and aging, are also obviated. Furthermore, the clocks 127 are generated without the need of a phase lock loop.

Figure 3:
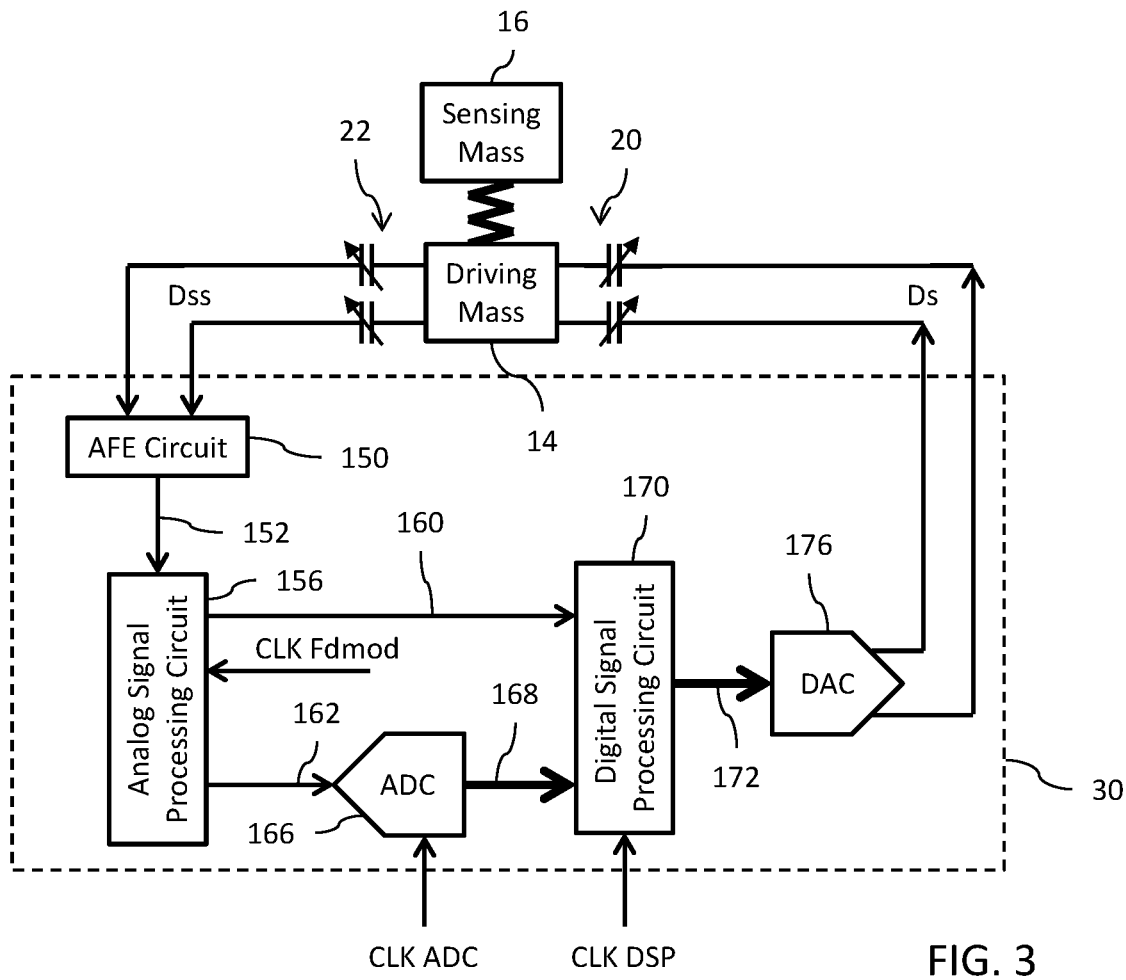
FIG. 3 is a block diagram of an embodiment for a drive control loop for the MEMS gyroscope sensor of FIG. 1.

Reference is now made to FIG. 3 which shows a block diagram of an embodiment for a drive control loop of the driving circuit 30 for the MEMS gyroscope sensor of FIG. 1. The driving circuit 30 includes an analog front end (AFE) circuit 150 having inputs coupled to the drive sensing capacitors 22 to receive the differential drive sense signal Dss (which is indicative of driving mass oscillation amplitude, frequency and phase). The AFE circuit 150 generates an analog sinusoid signal 152 (sin(2π*Fd)) which oscillates at the drive frequency Fd of the mechanical oscillation of the driving mass 14 of the MEMS microstructure 12. The AFE circuit 150 may comprise, for example, a charge to voltage (C2V) converter circuit that operates to convert the sensed differential charge on the drive sensing capacitors 22 to output a corresponding analog sinusoid signal 152.

The analog sinusoid signal 152 is input to an analog signal processing circuit 156 which also receives a demodulation clock signal (CLK Fdmod). The analog signal processing circuit 156 first converts the analog sinusoid signal 152 into a clock signal 160 having a frequency and phase corresponding to the frequency and phase of the mechanical oscillation of the driving mass 14. The analog processing circuit 156 further demodulates the analog sinusoid signal 152 using the demodulation clock signal CLK Fdmod to output an analog amplitude signal 162 having a voltage corresponding to the amplitude of the mechanical oscillation of the driving mass 14.

The analog amplitude signal 162 is converted by an analog-to-digital converter (ADC) circuit 166 to generate a digital amplitude signal 168 specifying the measured amplitude of the mechanical oscillation of the driving mass 14 produced in response to the applied driving signal Ds. Because of the demodulation performed by the analog processing circuit 156, this ADC circuit 166 can be implemented with a low-power and low-bandwidth circuit design. The ADC circuit 166 is clocked by one of the clocks 127 (CLK ADC) generated by clock generator circuit 125.

A digital signal processing circuit 170 receives the clock signal 160 and the digital amplitude signal 168 (which together provide information corresponding to the extracted frequency, phase and amplitude of the sensed drive motion of the driving mass 14) and frequency tracking and automatic gain control processing are applied to generate a digital drive signal 172 that is converted by a digital-to-analog converter (DAC) circuit 176 to output the analog differential drive signal Ds. The digital signal processing circuit 170 is clocked by one of the clocks 127 (CLK DSP) generated by clock generator circuit 125.

In an embodiment, the digital signal processing circuit 170 further operates to generate the demodulation clock signal CLK Fdmod. Alternatively, the demodulation clock signal CLK Fdmod can be provided by the clock signal 160.

Figure 4A:
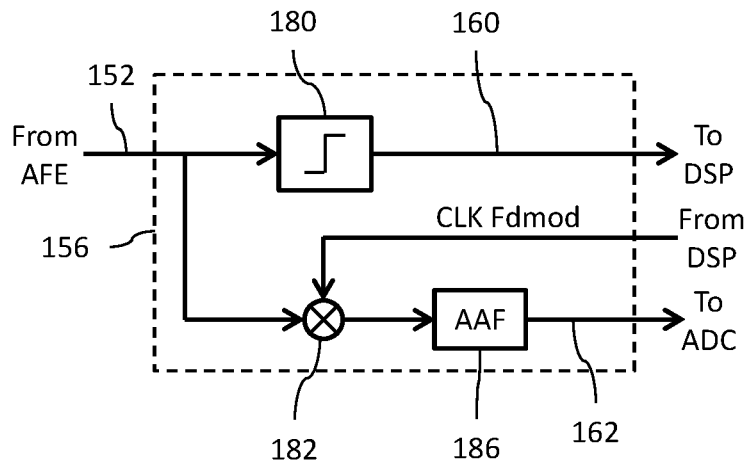
FIGS. 4A-4B show block diagrams for embodiments of the analog signal processing circuit for the drive control loop.

Reference is now made to FIG. 4A which shows a block diagram of an embodiment for the analog signal processing circuit 156. The analog sinusoid signal 152 is applied to the input of a continuous-time comparator circuit 180 that converts the analog sinusoid signal 152 into the clock signal 160 (where the clock signal has a frequency and phase that correspond to the frequency and phase of the mechanical oscillation of the driving mass 14). The comparator circuit 180 essentially functions as a zero-cross detector and forms a single bit quantizer. The analog sinusoid signal 152 is further applied to a first input of an analog mixing circuit 182. A second input receives the demodulation clock signal CLK Fdmod provided by the digital signal processing circuit 170. The signal output by the mixing circuit 182 is passed through a low-pass anti-aliasing filter (AAF) 186 to generate the analog amplitude signal 162 (having an amplitude that corresponds to the amplitude of the mechanical oscillation of the driving mass 14) that is sent to the ADC circuit 166 to generate the digital amplitude signal 168.

Figure 4B:
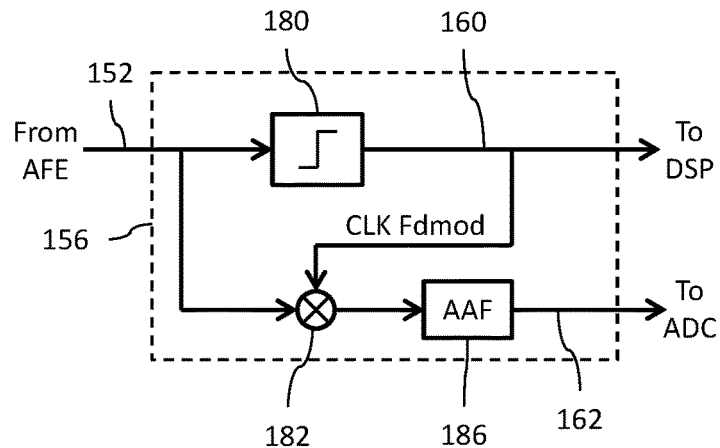

Reference is now made to FIG. 4B which shows a block diagram of an alternative embodiment for the analog signal processing circuit 156. The embodiment of FIG. 4B differs from the embodiment of FIG. 4A only in that the demodulation clock signal CLK Fdmod is provided by the clock signal 160.

The control loop solution shown in FIGS. 3 and 4A-4B offers a number of advantages over the prior art solution shown in FIG. 2: a) the ADC circuit 166 can be implemented using a low-power and low-bandwidth design in comparison to the ADC circuit 106, since it only needs to digitize the amplitude of the drive motion (which has a frequency at or near to DC); and b) a simpler algorithm can be implemented by the digital signal processing circuit 170 for implementing the frequency tracking and automatic gain control processing, because the amplitude, frequency and phase information have already been extracted by the AFE circuit 150 and are provided to the DSP circuit 170 as digital inputs.

Figure 5:
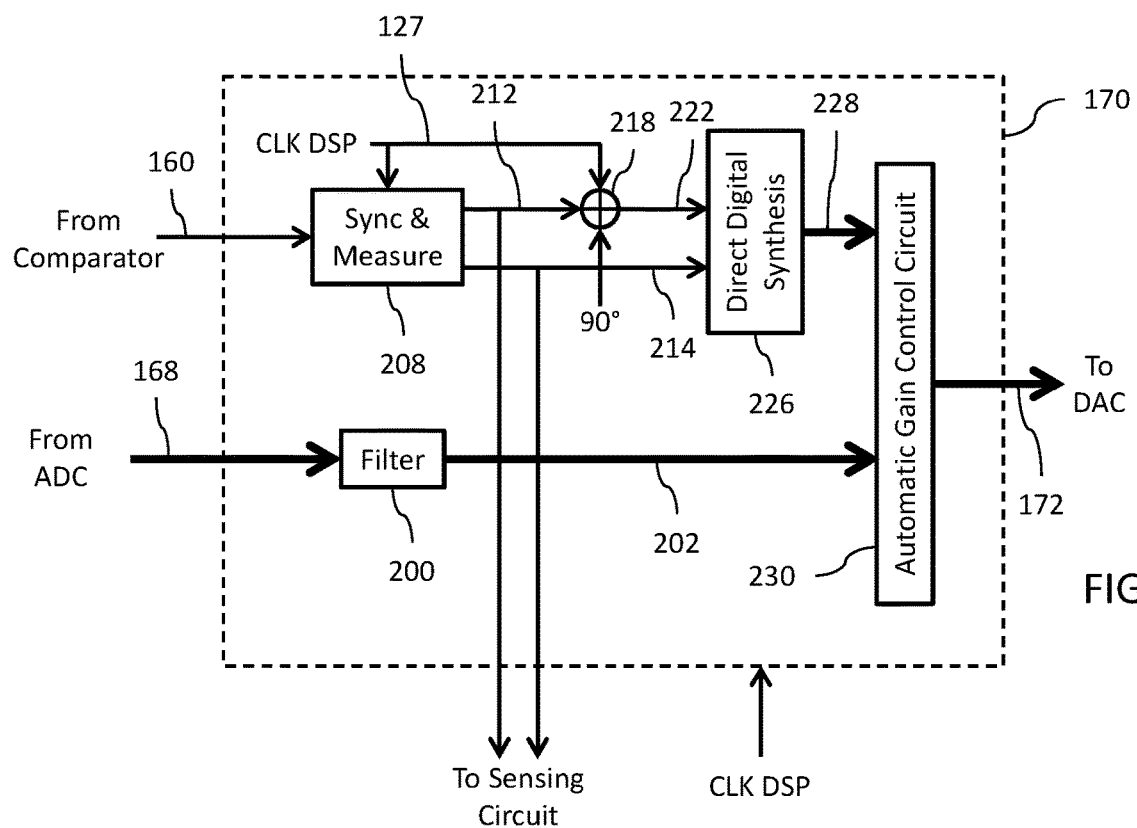
FIG. 5 shows a block diagram of an embodiment for the digital signal processing circuit for the drive control loop.

Reference is now made to FIG. 5 which shows a block diagram of an embodiment for the digital signal processing circuit 170. The digital amplitude signal 168 (Amp_d) output from the ADC circuit 166 is filtered by a digital filter circuit 200, which can be a low-pass filter of finite-impulse-response (FIR) type or infinite-impulse-response (IIR) type with a cut-off frequency around 1 kHz or less, to generate an oscillation amplitude signal 202 (Amp) specifying the measured amplitude of the mechanical oscillation of the driving mass 14 produced in response to the applied driving signal Ds. The digital filter circuit 200 is clocked by one of the clocks 127 (CLK DSP) generated by clock generator circuit 125.

A synchronization and measurement circuit 208 receives the clock signal CLK Fd 160 and synchronizes its phase to the system clock signal 127 oscillating at a frequency which is substantially greater than the frequency Fd of the mechanical oscillation of the driving mass 14. This system clock signal is, for example, one of the clocks 127 (CLK DSP) generated by clock generator circuit 125. Phase and frequency measurements are made on the synchronized clock signal 126 to generate a measured phase signal 212 ($\phi$d_m) corresponding to the measured phase $\phi$ of the mechanical oscillation of the driving mass 14 and generate a measured frequency signal 214 (Fd_m) corresponding to the measured frequency Fd of the mechanical oscillation of the driving mass 14. The synchronization and measurement circuit 208 uses the system clock signal 127 as a counting clock in order to measure the period (Td) of the clock signal 160 (where the measured frequency of clock signal 160 is then 1/Td) and furthermore detect the phase of the clock signal 160. Thus, circuit 208 is advantageously implemented using digital counter circuits which are simple to implement and provide robust performance. The measured phase signal 212, system clock signal 127 and phase shift value signal (shown at a selected phase shift value of 90° in FIG. 5) are applied to inputs of a phase shifting circuit 218 that operates to shift the measured phase signal 212 by the specified phase shift value (here, for example, preferably equal to 90°, but could have any selected angular value depending on application need) to generate a phase shifted signal 222($\phi$d_m+90°).

The measured frequency signal 214 and the quadrature phase shifted signal 222 are input to a direct digital synthesis (DDS) circuit 226 which operates as a digital frequency synthesizer to generate a digital sinusoid signal 228 (cos($2\pi$*Fdr)) at a drive frequency Fdr based on the measured frequency (Fd_m) and having a quadrature phase based on the phase shifted signal 222($\phi$d_m+90°). Driving with the quadrature phase relationship is a requirement for the drive control loop in order to produce oscillation of the driving mass 14. An automatic gain control (AGC) circuit 230 receives the digital sinusoid signal 228 and the detected amplitude signal 202. The digital sinusoid signal 228 has either its DC voltage level or its AC amplitude controlled by the AGC circuit 230, in response to the difference between the sensed oscillation amplitude signal 202 (Amp) and a preset amplitude value, to generate the digital drive signal 172 which is converted to the analog drive signal Ds for application of a controlled drive force to the driving mass 14 that will regulate the detected amplitude to be equal to the preset amplitude value. The DDS circuit 226 and AGC circuit 230 are clocked by one of the clocks 127 (CLK DSP) generated by clock generator circuit 125.

Figure 2A:
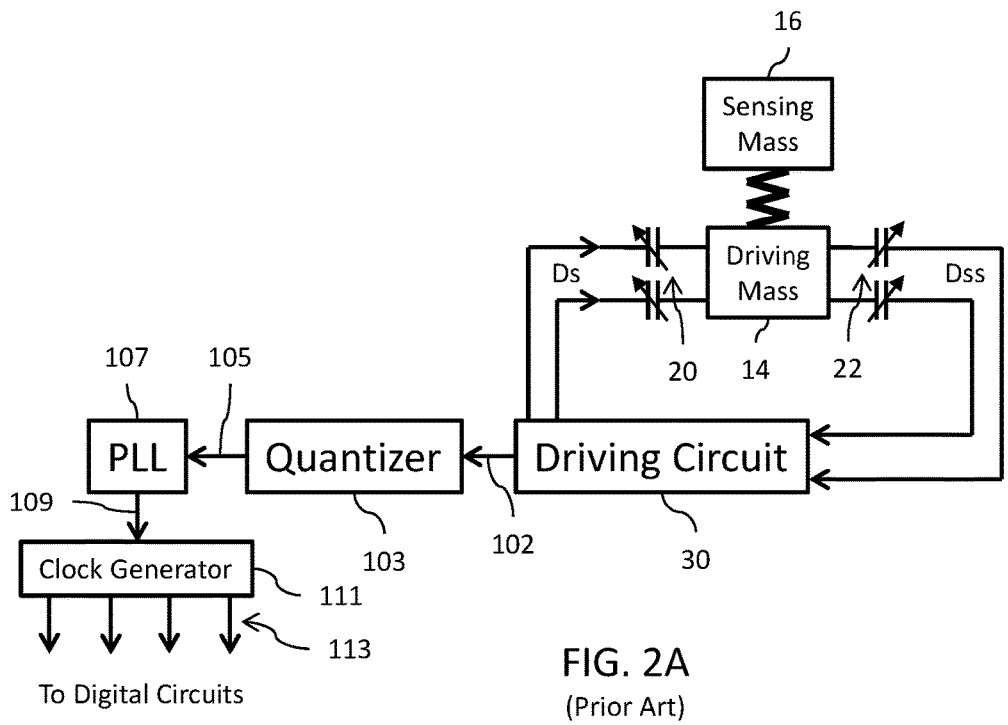
FIG. 2A is a block diagram of a prior art clock generation circuit for the MEMS gyroscope sensor of FIG. 1.
Figure 2B:
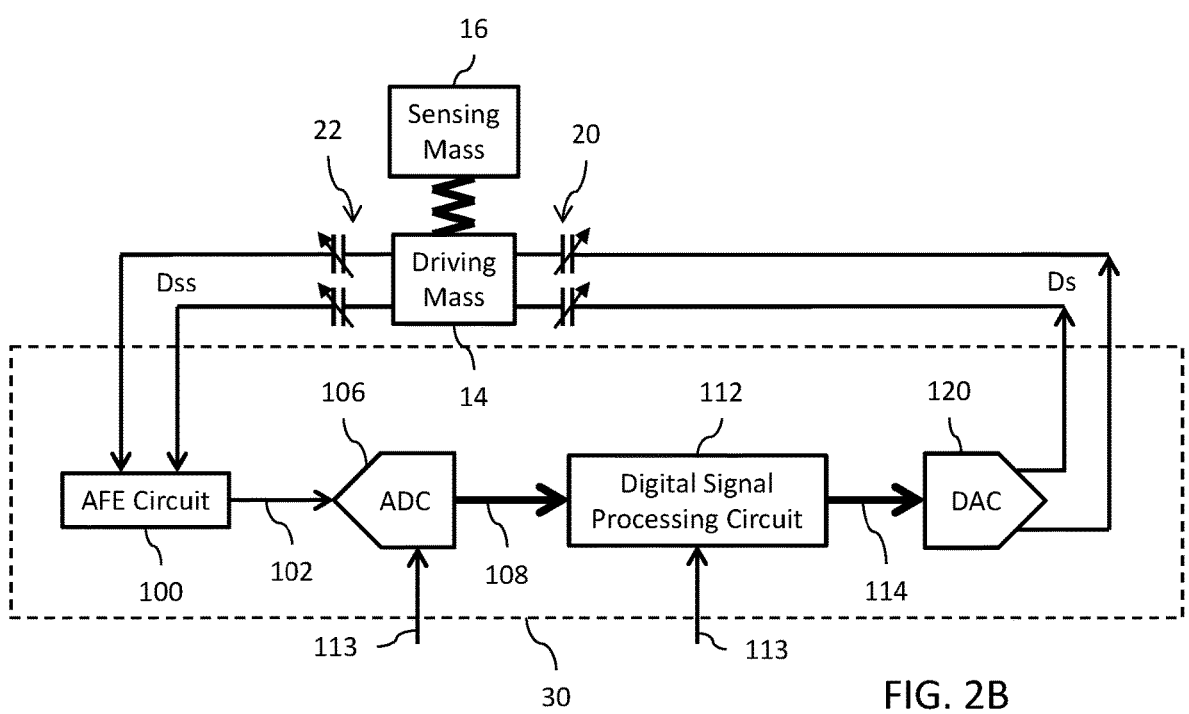
FIG. 2B is a block diagram of a prior art drive control loop for the MEMS gyroscope sensor of FIG. 1.

The control loop solution shown in FIGS. 3 and 5 offers a number of advantages over the prior art solution shown in FIGS. 2A and 2B: a) digital control is exercised over the frequency tracking of the drive control loop; b) the phase shift can be precisely controlled and is independent of variation in the drive frequency, process and temperature; c) any desired angle of phase shift (from 0° to 360°) can be selected through use of the phase shift value signal; d) there is no need to use a digital phase lock loop; e) the circuit is simpler to implement and more robust; f) the ADC circuit 166 can be implemented using a low-power and low-bandwidth design; and g) a simpler algorithm can be implemented by a low power digital signal processing circuit 170.

Figure 6:
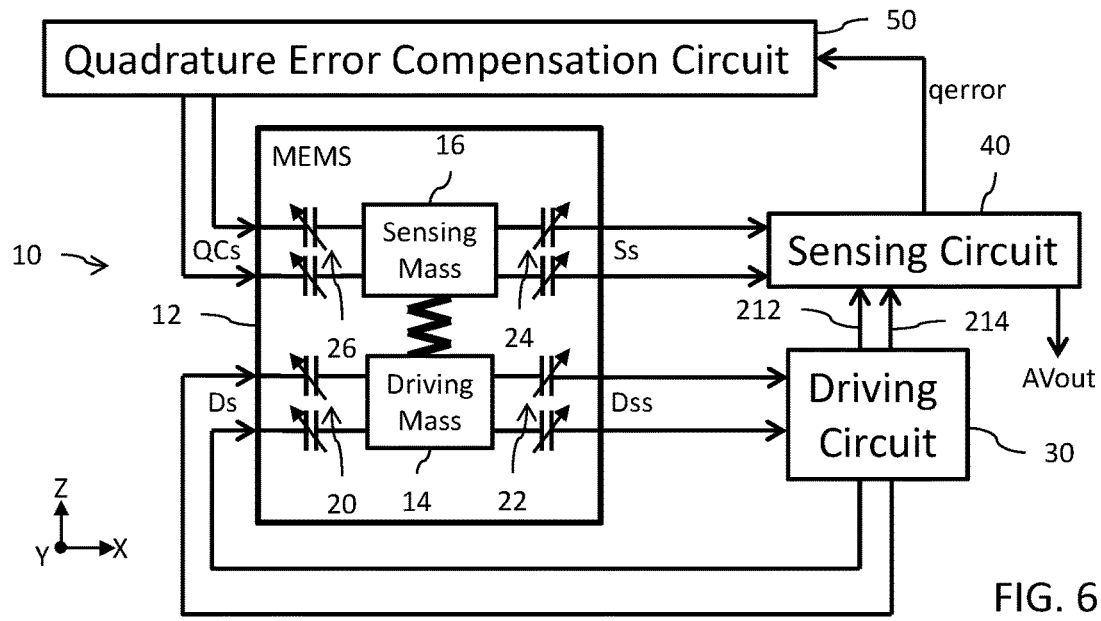
FIG. 6 is a block diagram of another embodiment for a MEMS gyroscope sensor.

Reference is now made to FIG. 6 which shows a block diagram of another embodiment for a MEMS gyroscope sensor. The same reference numbers used in FIGS. 1 and 6 refer to same or similar components. The implementation of FIG. 6 differs from the implementation of FIG. 1 in that the measured phase signal 212 (φd_m) corresponding to the measured phase of the mechanical oscillation of the driving mass 14 and the measured frequency signal 214 (Fd_m) corresponding to the measured frequency of the mechanical oscillation of the driving mass 14 as generated by the synchronization and measurement circuit 208 are output to the sensing circuit 40 as reference signals for demodulation operations. The sensing circuit 40 receives the differential sense signal Ss generated by the sensing capacitors 24 and indicative of displacement of the sensing mass 16 relative to the Y-axis, demodulates the differential sense signal Ss in response to the measured phase signal 212 (φd_m) and the measured frequency signal 214 (Fd_m), and outputs a signal indicative of sensed angular velocity (AVout) as a result of that demodulation.

Figure 7:
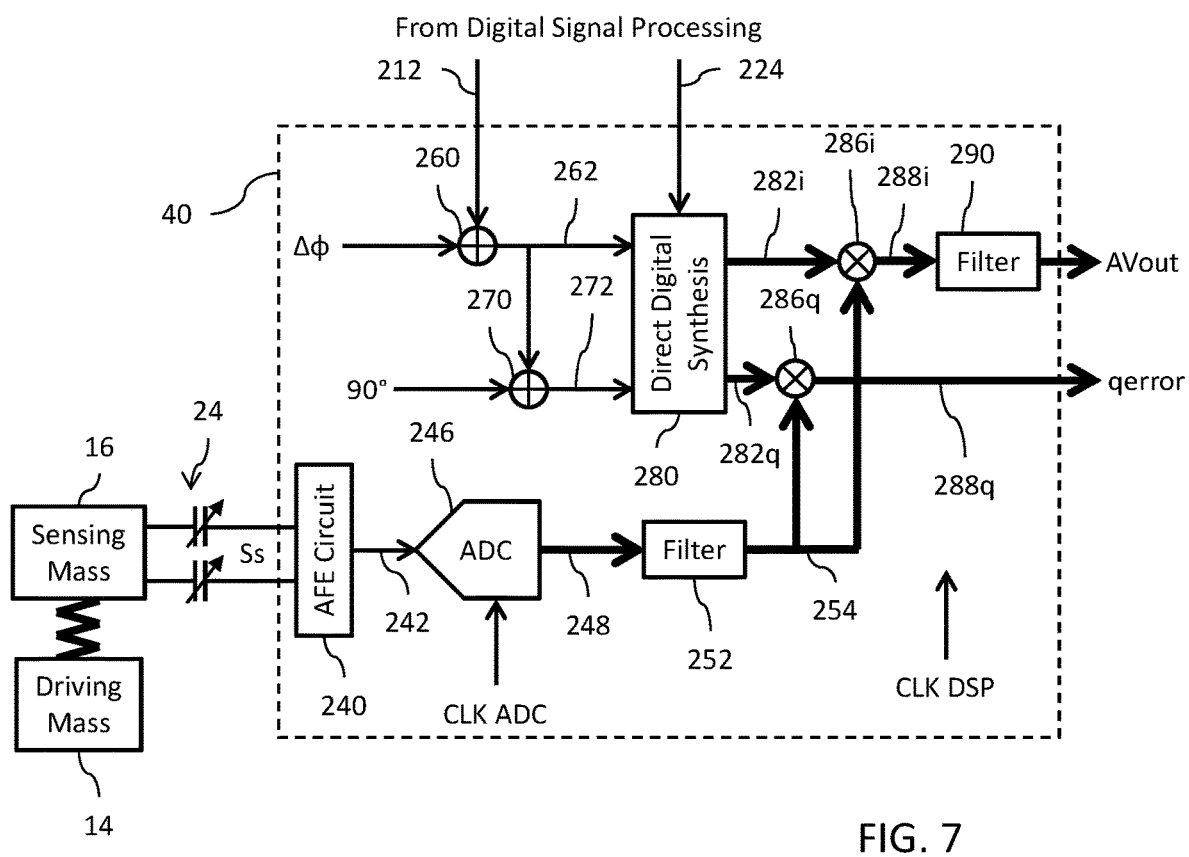
FIG. 7 is a block diagram of an embodiment for the sensing circuit for the MEMS gyroscope sensor of FIG. 1.

FIG. 7 shows a block diagram of the sensing circuit 40. The sensing circuit 40 includes an analog front end (AFE) circuit 240 having inputs coupled to the sensing capacitors 24 to receive the differential sense signal Ss (which is indicative of oscillation displacement due to the rate-induced Coriolis force applied to the sensing mass 16). The AFE circuit 240 generates an analog sinusoid signal 242 ($\sin(2\pi^*Fd)$) that oscillates at the amplitude and frequency Fd of the oscillation of the sensing mass 16 of the MEMS microstructure 12. The AFE circuit 240 may comprise, for example, a charge to voltage (C2V) converter circuit that operates to convert the sensed differential charge on the sensing capacitors 24 to output a corresponding analog voltage signal 242. The analog sinusoid signal 242 is converted by an analog-to-digital converter (ADC) circuit 246 to generate a digital Coriolis sinusoid signal 248. The ADC circuit 246 is clocked by one of the clocks 127 (CLK ADC) generated by clock generator circuit 125. The digital sinusoid signal 248 output from the ADC circuit 246 is filtered by a digital filter circuit 252 to remove quantization noise introduced by the analog-to-digital conversion and to generate a filtered digital Coriolis sinusoid signal 254. The digital filter circuit 252 may comprise a low-pass FIR or IIR filter with a cut-off frequency of about 10*Fd, in order to avoid introducing too much phase delay to the filtered digital Coriolis sinusoid signal 254. The digital filter circuit 252 is clocked by one of the clocks 127 (CLK DSP) generated by clock generator circuit 125.

A first phase shifting circuit 260 applies a phase shift of Δφ to the measured phase signal 212 (φd_m) to generate an in phase signal 262. It will be noted that the demodulation signal 212 originates in the driving circuit 30 and the phase shift of Δφ is introduced in the sensing circuit 40 to compensate for the phase response difference of the driving circuit 30 and sensing circuit 40 at the drive frequency Fd. A second phase shifting circuit 270 applies a phase shift of 90° to the in phase signal 262 to generate a quadrature phase signal 272. The measured frequency signal 214 (Fd_m), the in phase signal 262 and the quadrature phase signal 272 are input to a direct digital synthesis (DDS) circuit 280 which operates as a digital frequency synthesizer to generate an in phase digital sinusoid signal 282$i$ ($\cos(2\pi^*Fd)$) at a frequency Fd based on the measured frequency (Fd_m) and having a phase of φd_m+Δφ and a quadrature phase digital sinusoid signal 282$q$ ($\sin(2\pi^*Fd)$) at a frequency Fd based on the measured frequency (Fd_m) and having a phase of φd_m+Δφ. The DDS circuit 280 is clocked by one of the clocks 127 (CLK DSP) generated by clock generator circuit 125.

The in phase and quadrature phase digital sinusoid signals 282$i$ and 282$q$ are used as the local oscillator signals for performing a digital coherent quadrature demodulation of the filtered digital Coriolis sinusoid signal 254. An in phase digital mixing circuit 286$i$ demodulates the filtered digital signal 254 using the in phase digital sinusoid signal 282$i$ to recover digital data 288$i$ indicative of the in phase component (which is the baseband rate signal) of the sensed Coriolis movement of the sensing mass 14. The in phase digital data 288$i$ is digitally filtered by a filter 290 which can be a low-pass filter of the FIR or IIR type having a cut-off frequency determined by various final applications but typically in the range of several tens of Hz to about 1 kHz, and further gain and trim adjusted, to output a rate signal indicative of sensed angular velocity (AVout) due to the Coriolis movement of the sensing mass 16. The filter 290 is clocked by one of the clocks 127 (CLK DSP) generated by clock generator circuit 125. A quadrature phase digital mixing circuit 286$q$ demodulates the filtered digital Coriolis sinusoid signal 254 using the quadrature phase digital sinusoid signal 282$q$ to recover digital data 288$q$ indicative of the quadrature phase component of the sensed Coriolis movement of the sensing mass 14. The quadrature phase digital data 288$q$ is output as the sensed quadrature error (qerror) signal to the quadrature error compensation circuit 50.

Figure 8:
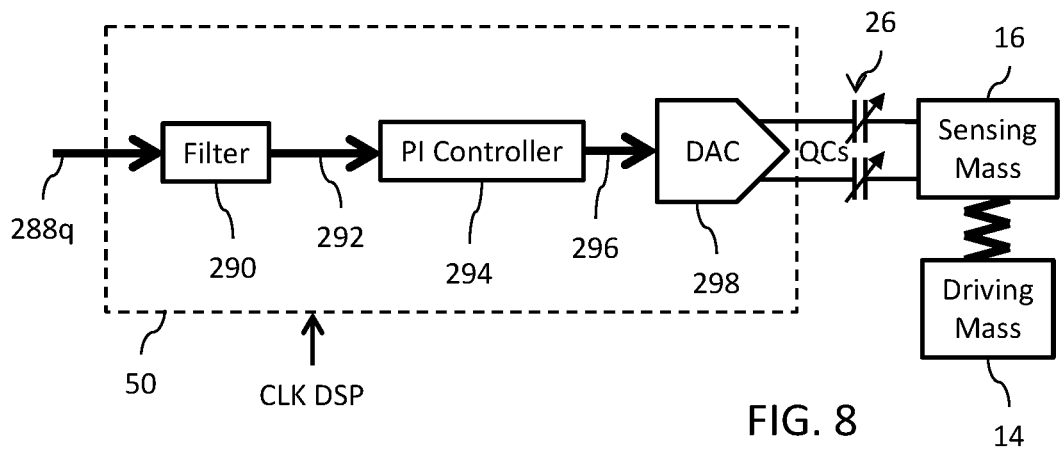
FIG. 8 is a block diagram of the quadrature error compensation circuit.

Reference is now made to FIG. 8 which shows a block diagram of the quadrature error compensation circuit 50. The quadrature error (qerror) signal is filtered by low-pass filter 290 to generate raw quadrature-phase data (qraw) 292. The digital filter 290 may comprise an FIR or IIR type filter having a cut-off frequency determined by the loop bandwidth of the quadrature cancellation loop, typically having a value in a range from about 100 Hz to 1 kHz. The raw quadrature-phase data qraw is processed in a proportional-integral (PI) controller 294 that operates to continuously calculate an error between the raw quadrature-phase data qraw (i.e., the sensed process variable) and a desired set point value (for example, zero quadrature error) and then apply a correction based on proportional and integral terms as known to those skilled in the art to generate a quadrature error compensation signal (Qecs) 296 for driving the calculated error towards zero. The PI controller 294 is clocked by one of the clocks 127 (CLK DSP) generated by clock generator circuit 125. A digital to analog converter (DAC) circuit 298 converts the digital value of the quadrature error compensation signal Qecs to generate the differential quadrature error compensation signal QCs. This differential quadrature error compensation signal QCs is a differential voltage signal applied to the quadrature error compensation capacitors 26. In response thereto, an electrostatic force is applied to the sensing mass 16 by the quadrature error compensation capacitors 26, where that electrostatic force counteracts the quadrature error force on the MEMS microstructure 12. The operation performed here by the proportional-integral controller 294 in the closed control loop for the quadrature error compensation circuit 50 is essentially to generate the quadrature error compensation signal Qecs such that the error in the quadrature-phase data qraw value is driven to zero.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method, comprising:
    driving a driving mass of a microelectromechanical system (MEMS) gyroscope using a drive loop including a first analog-to-digital converter (ADC) circuit and a first digital signal processing (DSP) circuit;
    wherein the driving mass is driven in a mechanical oscillation at a resonant drive frequency;
    generating a system clock independent of and asynchronous to the resonant drive frequency;
    generating a first clock and a second clock from the system clock;
    clocking the first ADC circuit of the drive loop with the first clock; and
    clocking the first DSP circuit of the drive loop with the second clock.

2. The method of claim 1, further comprising:
    generating a third clock and a fourth clock from the system clock;
    sensing a Coriolis displacement of a sensing mass coupled to the driving mass with a sensing circuit including a second analog-to-digital converter (ADC) circuit and a second digital signal processing (DSP) circuit;
    clocking the second ADC circuit of the drive loop with the third clock; and
    clocking the second DSP circuit of the drive loop with the fourth clock.

3. The method of claim 2, further comprising:
    generating a quadrature error signal by the sensing circuit from a quadrature component of the sensed Coriolis displacement of the sensing mass;
    generating a fifth clock from the system clock;
    generating a compensation force in response to a digital processing of the quadrature error signal;
    wherein said compensation force is applied to the sensing mass; and
    wherein digital processing of the quadrature error signal is clocked by the fifth clock.

4. A method, comprising:
    driving a driving mass of a microelectromechanical system (MEMS) gyroscope in a mechanical oscillation at a resonant drive frequency;
    wherein driving comprises:
        sensing the mechanical oscillation; and
        processing a signal dependent on the sensed mechanical oscillation in response to a system clock signal to generate a drive signal for application to cause movement of the driving mass; and
        generating the system clock signal independent of and asynchronous to the resonant drive frequency.

5. The method of claim 4, wherein processing comprises performing an analog-to-digital conversion clocked by a first clock signal generated from the system clock signal.

6. The method of claim 5, wherein processing comprises performing a digital signal processing operation on an output of the analog-to-digital conversion, wherein said signal processing operation is clocked by a second clock signal generated from the system clock signal.

7. The method of claim 4, wherein processing the signal dependent on the sensed mechanical oscillation comprises:
    generating an analog sinusoid signal having a frequency corresponding to a frequency of the mechanical oscillation of the driving mass and an amplitude corresponding to an amplitude of the mechanical oscillation of the driving mass;
    demodulating the analog sinusoid signal using a demodulation clock signal to generate an analog amplitude signal; and
    performing an analog-to-digital conversion of the analog amplitude signal in response to a first clock signal generated from the system clock signal.

8. The method of claim 7, wherein processing the signal dependent on the sensed mechanical oscillation comprises:
    generating an oscillation clock signal from the analog sinusoid signal;
    synchronizing the oscillation clock signal to a second clock signal generated from the system clock signal to output a synchronized oscillation clock signal;
    determining a phase and frequency of the synchronized oscillation clock signal; and
    generating a digital sinusoid signal as said drive signal in response to a quadrature shift of the determined phase and frequency.

9. A method, comprising:
    driving a driving mass of a microelectromechanical system (MEMS) gyroscope in a mechanical oscillation at a resonant drive frequency;
    sensing a Coriolis displacement of the sensing mass;
    processing a signal dependent on the sensed Coriolis displacement in response to a system clock signal to generate an angular velocity output signal indicative of the Coriolis displacement; and
    generating the system clock signal independent of and asynchronous to the resonant drive frequency;
    wherein processing comprises performing an analog-to-digital conversion clocked by a first clock signal generated from the system clock signal.

10. The method of claim 9, wherein processing comprises performing a digital signal processing operation on an output of the analog-to-digital conversion, wherein said signal processing operation is clocked by a second clock signal generated from the system clock signal.

11. A method, comprising:
    driving a driving mass of a microelectromechanical system (MEMS) gyroscope in a mechanical oscillation at a resonant drive frequency;
    sensing a Coriolis displacement of the sensing mass;
    processing a signal dependent on the sensed Coriolis displacement in response to a system clock signal to generate an angular velocity output signal indicative of the Coriolis displacement; and
    generating the system clock signal independent of and asynchronous to the resonant drive frequency;
    wherein processing comprises:
        generating an analog Coriolis sinusoid signal having a frequency and phase corresponding to a frequency and phase of the Coriolis displacement of the sensing mass;
        performing an analog-to-digital conversion of the analog Coriolis sinusoid signal in response to a first clock signal generated from the system clock signal to generate a digital Coriolis sinusoid signal;
        generating an in phase digital sinusoid signal in response to a frequency and phase of the mechanical oscillation of the driving mass;
        mixing the in phase digital sinusoid signal with the digital Coriolis sinusoid signal to generate a rate signal indicative of a sensed angular velocity for the angular velocity output signal; and
        digitally filtering the rate signal in response to a second clock signal generated from the system clock signal.

12. A method, comprising:
- driving a driving mass of a microelectromechanical system (MEMS) gyroscope in a mechanical oscillation at a resonant drive frequency;
- sensing a Coriolis displacement of the sensing mass;
- generating a quadrature error signal from a quadrature component of the sensed Coriolis displacement;
- processing the quadrature error signal in response to a system clock signal to generate a quadrature error compensation force for application to the sensing mass; and
- generating the system clock signal independent of and asynchronous to the resonant drive frequency.

13. The method of claim 12, wherein processing comprises performing a digital signal processing operation on the quadrature error signal, wherein said signal processing operation is clocked by a digital clock signal generated from the system clock signal.

14. The method of claim 13, wherein performing the digital signal processing operation comprises performing a proportional-integral (PI) control operation.

* * * * *